United States Patent [19]

Jelic

[11] E Patent Number: Re. 33,415

[45] Reissued Date of Patent: Oct. 30, 1990

[54] DOUBLE-BORE CAPILLARY-TUBE GAS DISCHARGE LAMP WITH AN ENVELOPE WINDOW TRANSPARENT TO SHORT WAVELENGTH LIGHT

[76] Inventor: Marinko Jelic, 25382 Westborne Dr., Dana Point, Calif. 92629

[21] Appl. No.: 458,160

[22] Filed: Dec. 28, 1989

Related U.S. Patent Documents

Reissue of:

[64] Patent No.: 4,810,924
Issued: Mar. 7, 1989
Appl. No.: 53,721
Filed: May 26, 1987

[51] Int. Cl.[5] ..... H01J 61/10; H01J 61/30

[52] U.S. Cl. ..... 313/609; 313/634

[58] Field of Search ..... 313/609, 610, 573, 634

[56] References Cited

U.S. PATENT DOCUMENTS

| | | | |
|---|---|---|---|
| 3,928,786 | 12/1975 | Campbell | 313/610 X |
| 4,002,922 | 1/1977 | Young | 313/553 X |
| 4,208,618 | 6/1980 | Heine | 313/610 X |
| 4,524,301 | 6/1985 | Cohen et al. | 313/634 X |

OTHER PUBLICATIONS

Capillary Lamps/Vacuum to UV Line Spectra ZN Lamps, CD Lamps/VU Line Spectra, Scientific Services C.

VUV Source for Photoionization Detector, Scientific Services Co.

*Primary Examiner*—Kenneth Wieder

*Attorney, Agent, or Firm*—Stetina and Brunda

[57] ABSTRACT

An improved gas discharge lamp having (i) a cylindrical quartz envelope with (i) a flat circular disk magnesium fluoride window substantially transparent to short wavelength light at one end of the cylindrical envelope, (iii) two tungsten or molybdenum electrodes each of which is sheathed in a capillary tube, and (iv) a partition within the envelope and between the tube-sheathed electrodes which partition defines, in combination with the envelopes, a bore about each of the electrodes and its sheathing tube. A gas discharge path between the electrodes produces bright light spots at the capillary tube orifices, at a region of the lamp proximate the window. The windowed quartz envelope is inexpensive to manufacture. The partition imparts strength and maintains the capillary tubes in precise alignment during manufacture. The tungsten or molybdenum electrodes support high currents providing high illumination. The flat magnesium fluoride window passes undistorted short wavelength light particularly suitable for use in instrumentation.

12 Claims, 1 Drawing Sheet

Fig. 1
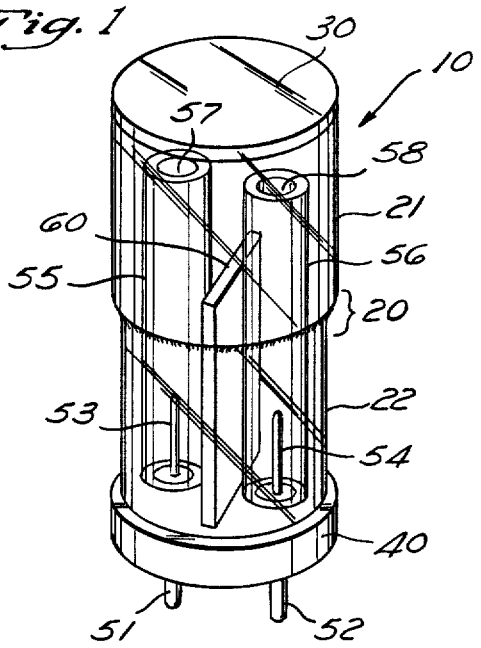
Fig. 2
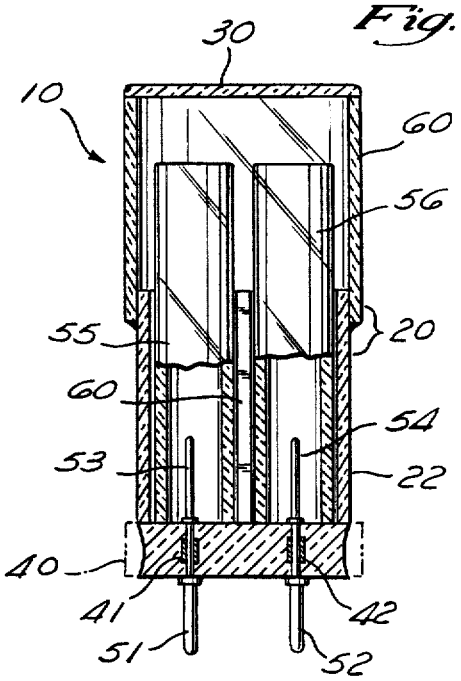
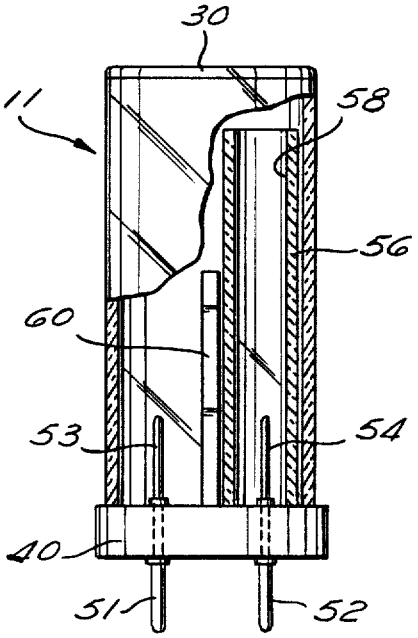
Fig. 3
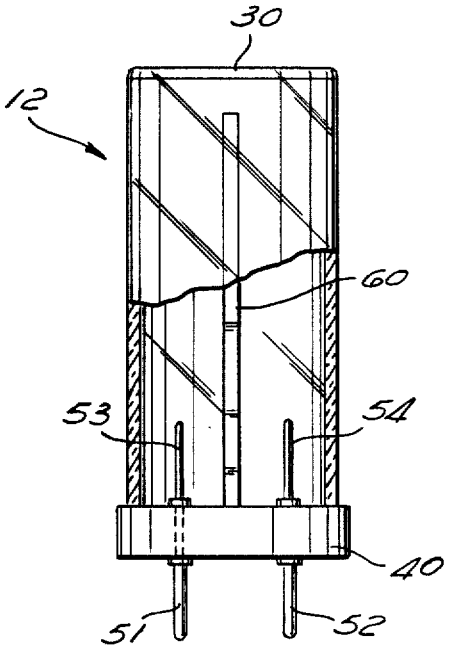
Fig. 4

DOUBLE-BORE CAPILLARY-TUBE GAS DISCHARGE LAMP WITH AN ENVELOPE WINDOW TRANSPARENT TO SHORT WAVELENGTH LIGHT

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention concerns gas discharge lamps, particularly those which emit short wavelength light usable in instrumentation.

2. Description of the Relevant Art

A gas discharge lamp encases electrodes and gas within an envelope which is transparent or translucent to light. When an electrical discharge path is established between the electrodes through ionized gas, then the ionized gas emits light radiation of a known frequency. This light radiation passes through the envelope and is [visable] *visible* or elsewise usable as a light source.

In the prior art a low-cost gas discharge lamp is produced with a light-transparent envelope, or dome, which is normally made of quartz. The envelope is filled with a gas, normally mercury vapor, and sealed to a base. Gas-tight electrical connection is made through this base to two electrodes within the chamber of the lamp envelope. These two electrodes may be, in some prior art lamps, separated by a partition which is within the quartz envelope and between the electrodes. This partition may be, in some cases, simply the central dividing wall of a double-bore glass tube from which the gas discharge lamp is fabricated. The partition defines, in combination with the envelope, a bore about each of the electrodes. The partition terminates and the bores join at that end of the domed envelope which is opposite to the base of the lamp. An electrical discharge path is established through the gas starting from one electrode, proceeding along the bore of this electrode then across the dome of the tube and then along the bore of the other electrode to electrically connect with the other electrode. Such a prior art gas discharge lamp is generally known as a double bore discharge lamp; a bore existing in the region of each electrode upon each side of the substantially centrally located partition. Such a double bore gas discharge lamp with a quartz envelope is inexpensive and easy to fabricate, and the partition imparts structural strength.

It is also known in the prior art to create an alternative gas discharge lamp producing an alternative electrical discharge path producing an alternative light illumination. This alternative gas discharge lamp is particularly directed to producing one or more regions of high illumination intensity, appearing as bright spots. In this alternative gas discharge lamp each electrode is sheathed in a tube, typically called a capillary tube. The tubes sheathing each electrode are fairly tight about the electrode and are substantially spaced parallel. No envelope partition exists within this type of gas discharge lamp. The electrical discharge path proceeds from the electrode within a capillary tube, along the bore of this tube, across the dome of the gas discharge lamp to the opening to the other capillary tube, along the bore of this tube, and finally terminates at the other electrode. This discharge path provides a particularly concentrated current density, and a resultantly bright region of ionized gas and light output, at the opening to the bore of each capillary tube. Two bright spots thus appear. This type of prior art gas discharge tube is sometimes called a single bore gas discharge lamp and sometimes called a capillary-tube gas discharge lamp.

Problems, and difficulties, exist in the manufacture of this alternative prior art capillary-tube gas discharge lamp. Special jigs must be used to hold the capillary tubes in position during manufacture. The capillary tubes are not always well or reliably aligned.

Furthermore, the quartz envelope which is commonly used for the double-bore gas discharge lamp or for the capillary tube, single bore, gas discharge lamp is not transparent to short wavelength light. Known frequency sources of short wavelength light are desired in many applications, particularly including instrumentation applications. Consequently, at least the single bore, or capillary, gas discharge lamp has been modified in the prior art to suitably emit short wavelength light radiation. This modification consists of making the *upper window portion of the* envelope of a special material, *such as magnesium fluoride,* which is substantially transparent to short wavelength light, [normally of boro silicate] *which window is normally fused to borosilicate* material *forming the remaining portion of the envelope.* This [boro silicate] *borosilicate* envelope is difficult and expensive to manufacture.

Moreover, a [boro silicate] *borosilicate* envelope will not seal reliably to electrodes of molybdenum of tungsten which are desired for their high current carrying capacity. Consequently within the prior art capillary-tube gas discharge lamps for short wavelength light emission electrodes of KOVAR material are used. This material, which is required in order to seal gas tight to [boro silicate] *borosilicate,* is inferior in current carrying capacity to tungsten or molybdenum electrodes.

Correspondingly, it is desired that some way should be found to more economically manufacture a gas discharge lamp producing short wavelength light particularly suitable for instrumentation. This lamp should simultaneously [possesses] *possess* high physical strength and be supportive of high currents for producing high illumination levels.

SUMMARY OF THE INVENTION

The present invention is embodied in a gas discharge lamp apparatus, and a method of manufacturing this apparatus. In accordance with one aspect of the present invention, a double bore gas discharge lamp is employed in combination with an envelope which is at least partially transparent to short wavelength light, creating thereby an inexpensive and rugged gas discharge lamp particularly suitable for instrumentation applications. Specifically, a gas discharge lamp having an envelope exhibiting a window region which is substantially transparent to short wavelength light radiation also includes a partition within the envelope and between the electrodes, creating thereby a double bore gas discharge lamp. Even more specifically the envelope and its partition are inexpensively formed from double bore quartz tube, and a window is formed, nominally in the dome region of the envelope, from magnesium fluoride.

In accordance with another aspect of the present invention, the characteristics of a double-bore, or partitioned, and of a single bore, or capillary tube, gas discharge lamp are synergistically combined. Specifically, in one variant embodiment gas discharge lamp in accordance with the present invention at least one, and preferably both, of the electrodes of a gas discharge lamp are each sheathed in a capillary tube. These capillary tube-sheathed electrodes are emplaced within each bore of a larger tube having two bores. By this manner of placement the capillary tubes are conveniently held in accurate position during lamp manufacture. They extend beyond the end of the doublebore tube and terminate in a domed region of the envelope of the lamp. In this position each capillary tube causes the production of a bright spot of light at the opening to the tube, and within the dome of the lamp, during operation of the lamp. When, as will be discussed below, this dome further incorporates a window which is transparent to short wavelength light then these precisely positioned bright spots are excellent for instrumentation applications.

In accordance with still another aspect of the present invention a gas discharge lamp which is substantially transparent to short wavelength radiation may still use high current capacity electrodes, particularly these made of tungsten or molybdenum, which allow a high level light output. This should be contrasted with the prior art wherein a [short-wavelength-light-transparent] envelope of [boro silicate] *borosilicate* necessitated the use of KOVAR or similar electrodes which were of low current capacity. Specifically, the envelope of the gas discharge lamp in accordance with the present invention is made of quartz and it contains a window, nominally made of magnesium fluoride, which is substantially transparent to short wavelength light. The electrodes may either be of molybdenum, or of tungsten which is spot welded to molybdenum to that molybdenum is the material through which electrical connection is made through the envelope of the gas discharge lamp. The quartz envelope seals well to the molybdenum, which is preferably in the shape of a thin ribbon in the region where [if] *it* passes through the envelope wall. A high-current electrical discharge path producing a bright short wavelength light output is established between the tungsten or molybdenum electrodes and through the ionized gas.

In accordance with still another aspect, the present invention might be considered to be the locating of a window which is transparent to short wavelength light within an envelope of a gas discharge lamp which envelope is not transparent to short wavelength light. Specifically, an envelope which is substantially made of relatively inexpensive *to manufacture* and easily workable quartz is fitted with a window of magnesium fluoride, creating thereby a gas discharge lamp emitting short wavelength light radiation selectively only through the window of the envelope.

In accordance with still another aspect, the present invention might be considered to be an improvement to the method of manufacture of a gas discharge lamp by holding, without jigs, electrodes when at least one of these electrodes is sheathed in a capillary tube. Specifically, this holding is by incorporating a partition within the envelope and between the electrodes. The partition defines in combination with the envelopes a bore about each of the electrodes including that at least one electrode which is sheathed. More specifically, the capillary-tube-sheathed electrodes are preferably fitted within the bores of a larger, plural-bore, tube.

In accordance with still another aspect, the present invention might be considered to be an improvement to the method of manufacture of a prior art gas discharge lamp which is transparent to short wavelength radiation by forming the envelope of this lamp of a material, nominally quartz, which seals well to a high current carrying capacity electrode, nominally molybdenum, while enabling the envelope to emit short wavelength radiation (to which quartz is substantially opaque) through a window.

By synthesis combination of these various aspects of the present invention, the preferred embodiment improved gas discharge lamp in accordance with the present invention has (i) an envelope having a window region substantially transparent to short wavelength light, (ii) electrodes at least one of which is sheathed within a capillary tube, and (iii) a partition within the envelope and between the electrodes in which partition defines, in combination with the envelope, a bore about each of the electrodes. The partition ends and the at least one capillary tube extends to a region proximate to the short-wavelength-light transparent window region of the envelope. As is particularly enabled by construction of the tube from quartz, the electrodes are of a high current carrying capacity material, preferably of tungsten or molybdenum. Because the lamp carries high current, it has a high light output level. Because the electrodes are within capillary tubes which are precisely positioned within the double bores, this high light output is concentrated at precisely positioned bright spots.

BRIEF DESCRIPTION OF THE DRAWINGS

FIG. 1 is a perspective view showing a first variant embodiment improved gas discharge lamp in accordance with the present invention.

FIG. 2 is a cross sectional view showing the first variant embodiment of the improved gas discharge lamp in accordance with the present invention;

FIG. 3 is a partial cross sectional view showing a second variant embodiment improved gas discharge lamp in accordance with the present invention.

FIG. 4 is a partial cross sectional view showing a third variant embodiment improved gas discharge lamp in accordance with the present invention.

DESCRIPTION OF THE PREFERRED EMBODIMENT

The present invention is embodied in a gas discharge lamp of improved construction. A perspective view of a first embodiment apparatus in accordance with the present invention is shown in FIG. 1, and a cutaway cross sectional view of the same first embodiment apparatus is shown in FIG. 2. The external contour of the gas discharge lamp 10 is generally columnar in shape, being derived from the cylindrical shape of envelope 20 which is normally made of quartz. The composite envelope 20 has a double-bore tube 22 at its lower region which is fused to a dome 21 at its upper region. The dome 21 may be made from a single short section of drawn and sealed quartz tube which is closed off at one end in order to form the top of lamp 10 and which is fused at its other end to tube 22, this tube having an outside diameter which is approximately the same as the outside diameter of double-bore tube 22. However, the dome 21 is preferably compositely made of a short section of quartz tube which is sealed to and about a planar circular disk 30 as well as to double-bore tube 22. This manner of construction forms a substantially flat window. The disk 30 is preferably substantially transparent to short wavelength light. It is normally made of magnesium fluoride.

Continuing in FIG. 1, the other end of envelope 20 is crimped, or pinched and sealed, or fused, at the base region 40. Electrical pins 51, 52 electrically connect through the base region 40 to respective electrodes 53, 54 (visible in FIG. 2). Each of the electrodes 53, 54 is sheathed by a respective one of tubular elements—sometimes called capillary tubes—55, 56. The tubular elements 55, 56 extend from the base member 40 in spaced parallel positions respectively sheathing electrodes 53, 54 until they terminate in open ends, or orifices, 57, 58 (visible in FIG. 1) near the window disk 30 of envelope 20.

Between the electrodes 53, 54 and their encasing tubular elements 55, 56, and also within the envelope 20 of the gas discharge lamp 10, is the partition 60 of the double-bore tube 22. The partition 60 is substantially a bisecting plane extending between the cylindrical sidewalls of double-bore tube 22. The partition 60 is integral with the double-bore tube 22, and it can be considered a natural and necessary incident of such a tube in order to enable it to define two bores. The partition 60 proceeds from the base region 40 to a region within the dome 21 which is short of the orifices 57, 58 to the tubular members 55, 56. The partition 60, although shorter than the tubular members 55, 56, substantially divides the interior of the envelope 20 into a pair of bores; i.e. creating a double bore gas discharge lamp.

Electrical connection is made to electrodes 53, 54 within gas discharge lamp 10 through respective pins, or wires, 51, 52. Each of the electrodes 52, 54 is normally formed from tightly coiled wire, and the pins 51, 52 either directly are, or are extruded or connected to be, of essentially wire diameter. Consequently, the electrodes and their pins can, in one variant, be constructed as and be considered to be a single unitary wire—even [through] *though* this wire might be coiled at one end and thickened at its other end. It is, however, preferred that the electrode 53, nominally made of coiled tungsten or molybdenum wire, should be connected, nominally by spot welding, to a thin foil strip 41, nominally of molybdenum. This foil strip 31 preferably is further connected, again nominally by welding, to pin 51, which is nominally again molybdenum. Likewise, electrode 54 connects through foil strip 42 to pin 52. The thin foil strip is of a geometry which promotes gas tight sealing to the double-bore tube 22 and/or the capillary tubes 55, 56 in the area of case region 40. Particularly, the base region 40 of the gas discharge lamp 10 may be economically created simply by heating all tubes 22, 55, 56 in the area of the base region 40 while the envelope 20 is within the proper gaseous atmosphere (e.g., mercury vapor or other rate gases such as neon, krypton, [zenon] *xenon*, argon and the like) and then pinching closed all tubes 22, 55, 56 into a solid mass. This seals the base region 40 about the strips 41, 42. The closed, gas-containing, gas discharge lamp is thus formed.

Moreover in accordance with the present invention, each of the double-bore tube 22 and the capillary tubes 55, 56 contained therein are preferably of quartz while the foil strips 44, 42 are preferably of molybdenum. The quartz seals well to the molybdenum, and the gas-tight seal so formed is very reliable. Meanwhile the materials of electrodes 53, 54—which are to the interior of envelope 20 from the foil strips 41, 42—can each be essentially any material which electrically and mechanically connects well to molybdenum. Since molybdenum connects well to molybdenum, either or both of the electrodes 53, 54 and the pins 41, 42 may be of this material. Alternatively, tungsten connects well, such as by welding, to molybdenum so that the electrodes 53, 54 may be beneficially formed of this material also.

The improved gas discharge lamp 10 in accordance with the present invention contains a selected gas and mercury vapor, in the sealed cavity defined by envelope 20, disk 30, and base region 40. When the gas discharge lamp 10 is electrically connected, normally by plugging, to a source of electrical potential, between electrical pins 51 and 52, then this potential appearing across electrodes 53 and 54 causes ionization of the gas within the gas discharge lamp 10, and causes an electrical arc to be developed and sustained for so long as this voltage is maintained. This electrical arc is concentrated in density at the orifice 57 of tube 55 and at the orifice 58 of the tubular member 56. These two locations appear as two bright spots in the light emission from the lamp 10.

In operation of gas discharge lamp 10, an electrical discharge path through ionized gas within the region of the lamp 10 proximate to disk 30 causes emission of light radiation at a single frequency. If this light radiation is of a short wavelength, as is the case when the ionized gas is mercury vapor, then the light will not substantially pass through any portions of envelope 20 which are made of quartz. It will, however, pass through magnesium fluoride disk 30. Because the disk is planar, and because the gaseous discharge path is located immediately inside the gas discharge lamp 10 and near to the disk 30, the emitted light will be substantially transmitted through disk 30 and out of lamp 10. This short wavelength light radiation is particularly useful in instrumentation applications.

The electrical discharge path between the electrodes 53, 54 within gas discharge lamp 10 should be understood to produce ionizing radiation in the form of light because of a production of ions in the gaseous media by the passage of electrical current therethrough. This electrical current, or ionization current, or gas current, is in an amount which is determined by the geometries and dimensions of the electrical discharge path, by the gaseous media through which the electrical discharge transpires, and by the material from which the electrodes 53, 54 are constructed. In the present invention, the electrodes 53, 54 are preferably constructed of either tungsten or molybdenum material.

A second variant embodiment gas discharge lamp 11 in accordance with the present invention is shown in cross sectional view FIG. 3. As may be observed by comparison to the cross sectional view of the first variant embodiment of the present shown invention in FIG. 2, the second variant embodiment is similar to the first variant embodiment save that one of the tubular members 55, 56 is no longer sheathing one of the two electrodes 53, 54; herein tubular member 55 no longer sheathes electrode 53. Consequently, the path of the gaseous discharge is substantially from electrode 53 along the bore created about such electrode 53 within envelope 20 by partition 60, across the lower planar surface of disk 30, and down the opposite bore to the orifice 58 of tubular member 56 surrounding electrode 54.

This second variant embodiment gas discharge lamp 11 obviously has a more concentrated light output at the orifice 58 tubular member 56, which is in a one direction relative to partition 60, than it has proximate to electrode 53 which is in the other direction relative to such partition 60. One bright spot only, located at the orifice 58 to tubular member 56, appears. The electrical connector pins 51, 52 by which such gas discharge lamp 11 is electrically connected are normally situated symmetrically perpendicular to, and on opposite sides of, the plane of partition 60. Thereby, the particular orientation in which the gas discharge lamp 11, which is electrically reversible, is plugged will determine to which side of the plug socket the bright spot is obtained. This differential light output on each side of partition 60 and of gas discharge light 11 enables the gas discharge lamp to be selectably reversably plugged within a single plug socket in order that a relatively bright, or a less bright, level of illumination intensity should be attained in a given direction from such plug socket. This electable determination of the level of illumination intensity based upon a reversible plugable connection of the gas discharge lamp 11 is useful in instrumentation applications wherein controls, sensors, and the like may desirably be provided with an alternatively selectably predetermined level of illumination intensity.

It is possible to extend the inventive concept embodied in the second [vaient] *variant* embodiment gas discharge tube 11 shown in FIG. 3. Instead of simply making one bore at the double-bore tube 22 to be without a tubular member sheathing the electrode therein while emplacing a tubular member about the electrode within the other bore, tubular members may instead be made of different interior diameters, or at least of different orifice diameters. By this construction each of the double bores of the gas discharge lamp in accordance with the present invention will again contain a capillary tube, as in the first embodiment. However since these tubes present orifices which differ in area, shape, and/or distance from window 30, then the light spots, and level of illumination intensity, will be made to vary between the sides of the gas discharge lamp.

It is further possible to extend the inventive concepts embodied in each of the first and/or the second embodiments to gas discharge lamps having more than two electrodes, associated bores, and potentially associated tubular members. All of a possible multiplicity of electrodes which are energized will, of course, interact in producing a composite gas discharge and resultant light illumination. However, it may be readily envisioned how a single unsheathed, centrally located, electrode which is energized at one polarity could be radially surrounded by a plurality of capillary-tube-sheathed-electrodes, each of which is potentially of a different cross sectional area and/or shape and/or height, which are each energized at the opposite polarity. A ring of light spots, each one being of selectable shape and intensity, will appear at the dome of such a multiple-electrode multiple-bore gas discharge lamp.

It is important to remember how ably this potential complexity is supported by the method of manufacture in accordance with the present invention. Each tubular member, or capillary tube, is, regardless of length or internal shape and/or area, held within a corresponding bore. So long as the internal diameters of the possible multiplicity of bores fit the external diameters of the corresponding possible multiplicity of capillary tubes, everything is held in precise alignment during manufacture. Gas discharge tubes of an unprecedented degree of internal complexity can thus be readily created.

The sophistication of conventional vacuum tubes should be compared, even though such tubes are used for distinctly different purposes. It is known within conventional vacuum tubes to position metal members—anodes and grids and cathodes and the like to obtain variously desired [tue] *tube* functions. The present invention effectively teaches how to efficiently and effectively position the selectable orifices of a selectable multiplicity of capillary tubes (each sheathing an electrode) spatially within a gas discharge lamp. This positive positional control means that the path of ionization, and the resultant emission of light, can be selectively predetermined. Consequently, even [a] *an* indicia-displaying gas discharge lamp of the display nature of a NIXIE TM tube could be fabricated in accordance with the present invention, if desired.

A final, third, variant embodiment of a gas discharge lamp 12 in accordance with the present invention is shown in FIG. 4. This particular embodiment has two electrodes 53, 54 which are separated by a partition 60 within an envelope 20 which contains gas. The gas will be ionized, producing a light radiation output, when an electrical potential is applied between connector pins 51, 52 and resultantly between electrodes 53, 54. In accordance with the present invention, certain materials are used in construction of this third variant embodiment of the present invention which incorporates a window. Particularly, the cylindrical envelope 20 is made of quartz, while the substantially planar circular disk window 30 sealing a one end of such cylindrical envelope 20 is made of magnesium fluoride. The quartz is substantially opaque to short wavelength light radiation whereas the magnesium fluoride is substantially transparent to the same short wavelength light radiation.

It is significant in the specific choice of materials that quartz is relatively inexpensive. It is additionally easily and economically fused, machined, and drawn by conventional processes. The entire envelope is thus economical in cost. Of significance in the particular geometry shown in FIG. 4 is the fact that the magnesium fluoride window 30 is flat and is also of uniform thickness. This flat planar window will not [defuse] *diffuse* light emitted from ionized gas within the gas discharge lamp 12 such as would occur if the window were curved and/or of varying thickness and thus acted as a crude lens. Although the short wavelength light output from the gas discharge lamp 10 through the window 30 is illustrated aspect ratio of lamp height to lamp diameter ensures that the light is emitted with low dispersion.

After such internal reflections as will naturally occur within the interior of cylindrical envelope 20, substantially all of the short wavelength light emission of gas discharge lamp 12 will be through the circular disk 30. This selective directional emission is, of course, not the case for long wavelength light radiation to which cylindrical quartz envelope 20 as well as disk 30 is also substantially transparent. If the tube is intended to be used for the production of both long and short wavelength light radiation, and if it is also desired that such radiation should be emitted substantially through circular disk 30, then the inside surface of cylindrical envelope 20, and the surface of base member 40 which faces the cavity of gas discharge lamp 10, may, either one or both, be coated with a reflecting material to aid that light radiation should be reflected from these surfaces, and should not be absorbed or transmitted. Such a reflectorized coating may be obtained by a vacuum deposition of silver, gold or other reflecting substances to the surfaces.

The detailed method of manufacturing the gas discharge tube in accordance with the present invention is as follows.

First, one or more relatively smaller, capillary, tubes are inserted axially within at least one bore of a relatively larger double-bore quartz tube. Then, at least one of the one or more capillary tubes is preferably, but not necessarily extended beyond the end of the double-bore tube at it's distal end. The capillary tube resides within the dome and is physically supported in this residence by each bore of the double bore tube. Next, an electrode is inserted into the capillary tube. If two or more capillary tubes have been inserted then another electrode is inserted into the other capillary tube within the double bore tube. Next, a vacuum is drawn from all the tube ends and all tubes are changed with gas from their ends which are positioned oppositely the dome. Both the double bore tube and the one or more capillary tubes are subsequently crimped and fused about the electrodes.

This creates a sealed gas discharge tube which has (i) at least one capillary tube inserted within a bore of the double bore tube, (ii) at least one capillary tube supported by the bore within which it is inserted to extend into the dome, (iii) at least one capillary tube having an electrode extending through the crimped and fused region to the outside of the gas discharge tube, and [(ii)] *(iv)* another electrode extending through the crimped and fused region to the outside of the gas discharge tube. Upon such times as an adequate electrical potential across the electrodes initiates a gas discharge path through the gas of the gas discharge tube then this path will proceed from electrode to electrode particularly through an end of the at least one capillary tube which is extending into the dome at the tube. The gas discharge path through the end of the at least one capillary tube causes a light emission which appears as a bright spot at the location of the lamp end.

In consideration of the preceding explanation, the present invention should be observed to have a first, preferred, embodiment wherein a gas discharge lamp has an envelope with a window region substantially transparent to short wavelength light. One or more *of* the electrodes, each within a respective bore of such lamp, are each preferably sheathed in a tube. This is a partition within the envelope and between the electrodes. The partition defines, in combination with the envelope, a bore about each of the electrodes. The partition and the bores hold the capillary tubes in position. A gas discharge path proceeds through the orifice of each capillary tube, causing a concentrated light emission, or bright spot, at this location. This light is emitted through the short-wavelength-light transparent window of the envelope.

Although the first variant preferred embodiment of the present invention incorporates a combination of features, it should be realized that certain aspects of the present invention may be separately isolated and selectively employed. For example, to a prior art gas discharge lamp wherein one or both electrodes are sheathed within tubes (sometimes called capillary tubes), the gas discharge lamp in accordance with the present invention additionally incorporates a partition defining bores within the envelope and between the electrodes (and may still further additionally incorporate a window region transparent to short wavelength light). The gas discharge lamp in accordance with the present invention thereby comprises a double-bore capillary-tube discharge lamp. For example, to a prior art gas discharge lamp having a partition with the envelope and between the electrodes, the gas discharge lamp in accordance with the present invention additionally incorporates a capillary tube sheathing for one or both of the electrodes, and/or further additionally incorporates a window region which is substantially transparent to the short wavelength light. Finally, the gas discharge lamp in accordance with the present invention may be considered, in one aspect, to incorporate a short-wavelength-light-opaque envelope and short-wavelength-light-transparent window. The envelope and window are constructed of particular materials, whatsoever internal electrodes and/or partitions exist within such lamp. The preferred envelope is made of quartz save for a window region, substantially transparent to short wavelength light, which is made of magnesium fluoride.

Accordingly, the present invention should be considered to be defined by the language of the following claims, only, and not solely in accordance with the particular embodiments within which such invention has been taught.

What is claimed is:

1. A gas discharge lamp comprising:

an elongate tubular envelope having an integrally formed partition extending axially from one end of said envelope toward the opposite end of said envelope defining a pair of bores within the interior of said envelope disposed on opposite sides of the partition;

an electrode disposed within each of said pair of bores extending axially from one end of said envelope toward the opposite end of said envelope; and a capillary tube disposed about at least one of said electrodes extending from said one end of said envelope toward said opposite end of said envelope through a distance greater than the axial extension of said partition; and a window disposed at said opposite end of said envelope, said bores being sized to retain said capillary tube in axial alignment within said envelope.

2. The gas discharge lamp according to claim 1 wherein said window is formed of a material substantially transparent to short wavelength light.

3. The gas discharge lamp according to claim 2 wherein said material comprises:

magnesium fluoride.

4. The gas discharge lamp according to claim 1 wherein the electrodes are formed of material from the group consisting of:

tungsten and molybdenum.

5. The gas discharge lamp of claim 3 wherein said envelope is formed of quartz.

6. The gas discharge lamp of claim 5 wherein said window comprises a dome member positionable over the opposite end of said envelope.

*7. A gas discharge lamp comprising:*

*an elongate tubular envelope having an integrally formed partition extending axially from one end of said envelope toward the opposite end of said envelope defining a pair of bores within the interior of said envelope disposed on opposite sides of the partition;*

*an electrode disposed within each of said pair of bores extending axially from one end of said envelope toward the opposite end of said envelope; and*

*a capillary tube disposed about at least one of said electrodes extending from said one end of said envelope toward said opposite end of said envelope; and*

*a window disposed at said opposite end of said envelope, said bores being sized to retain said capillary tube in axial alignment within said envelope.*

*8. The gas discharge lamp according to claim 7 wherein said window is formed of a material substantially transparent to short wavelength light.*

*9. The gas discharge lamp according to claim 8 wherein said material comprises:*

*magnesium fluoride.*

*10. The gas discharge lamp according to claim 7 wherein the electrodes are formed of material from the group consisting of:*

*tungsten and molybdenum.*

*11. The gas discharge lamp of claim 7 wherein said envelope is formed of quartz.*

*12. The gas discharge lamp of claim 8 wherein said window comprises a dome member positionable over the opposite end of said envelope.*

* * * * *